US008305186B1

(12) United States Patent
Myers

(10) Patent No.: US 8,305,186 B1
(45) Date of Patent: Nov. 6, 2012

(54) RESISTIVE TEMPERATURE DETECTOR ASSEMBLY

(75) Inventor: Bryan Jacob Myers, Andover, MN (US)

(73) Assignee: Minco Products, Inc., Minneapolis, MN (US)

( * ) Notice: Subject to any disclaimer, the term of this patent is extended or adjusted under 35 U.S.C. 154(b) by 0 days.

(21) Appl. No.: 13/216,768

(22) Filed: Aug. 24, 2011

Related U.S. Application Data

(60) Provisional application No. 61/402,068, filed on Aug. 24, 2010.

(51) Int. Cl.
*H01C 7/02* (2006.01)
(52) U.S. Cl. .......................................... 338/25; 338/28
(58) Field of Classification Search ............... 338/25
See application file for complete search history.

(56) References Cited

U.S. PATENT DOCUMENTS

| 4,375,056 A * | 2/1983 | Baxter et al. ............. 338/25 |
| 4,464,646 A * | 8/1984 | Burger et al. ............. 338/25 |
| 4,673,300 A * | 6/1987 | Wilhelmson et al. ....... 374/182 |
| 5,827,960 A * | 10/1998 | Sultan et al. ............. 73/204.26 |
| 6,354,736 B1 * | 3/2002 | Cole et al. ............... 374/185 |

* cited by examiner

*Primary Examiner* — Kyung Lee
(74) *Attorney, Agent, or Firm* — Nawrocki, Rooney & Sivertson, P.A.

(57) ABSTRACT

A resistive temperature detector assembly characterized by improved calibration means is generally provided. The assembly includes a primary resistive element, characterized by a temperature coefficient of resistance TCR1, for detecting temperature, and a calibration component characterized by first and second resistive elements, each operatively united with each other, and with the primary resistive element. The first resistive element is configured and/or adapted so as to permit selective passage of current through at least a portion thereof, with the first and second resistive elements characterized by temperature coefficients of resistance TCR1 and TCR2, TCR1 having a value intermediate the value of TCR1 and TCR2.

15 Claims, 7 Drawing Sheets

|   | Pick Adjustment | Configurations | | | Δ Resistance | Resistance Reading | |
|---|---|---|---|---|---|---|---|
|   |   |   |   |   |   | -0.03 | 0.03 |
|   |   |   |   |   |   | [Min, | Max] |
| 1 | 0.14 |   |   | -0.07 | -0.28 | -0.35 | 0.32 | 0.38 |
| 2 | 0.56 |   |   |   | -0.28 | -0.28 | 0.25 | 0.31 |
| 3 |   | 0.14 |   | -0.07 | -0.28 | -0.21 | 0.18 | 0.24 |
|   | Bridge Adjustment | 0.14 |   |   | -0.28 | -0.14 | 0.11 | 0.17 |
| 1 | -0.07 |   |   | -0.07 |   | -0.07 | 0.04 | 0.10 |
| 2 | -0.28 |   |   |   |   | 0.00 | -0.03 | 0.03 |
| 3 |   | 0.14 |   | -0.07 |   | 0.07 | -0.10 | -0.04 |
|   |   | 0.14 |   |   |   | 0.14 | -0.17 | -0.11 |
|   |   |   | 0.56 | -0.07 | -0.28 | 0.21 | -0.24 | -0.18 |
|   |   |   | 0.56 |   | -0.28 | 0.28 | -0.31 | -0.25 |
|   |   | 0.14 | 0.56 | -0.07 | -0.28 | 0.35 | -0.38 | -0.32 |
|   |   | 0.14 | 0.56 |   | -0.28 | 0.42 | -0.45 | -0.39 |
|   |   |   | 0.56 | -0.07 |   | 0.49 | -0.52 | -0.46 |
|   |   |   | 0.56 |   |   | 0.56 | -0.59 | -0.53 |
|   |   | 0.14 | 0.56 | -0.07 |   | 0.63 | -0.66 | -0.60 |
|   |   | 0.14 | 0.56 |   |   | 0.70 | -0.73 | -0.67 |

FIG. 5

$$TCR = \frac{R_{100°C}}{R_{0°C}}$$

$$Calibration\ Component\ TCR = \frac{(R_{Foil\ 1} \times TCR_{Foil\ 1}) + (R_{Foil\ 2} \times TCR_{Foil\ 2})}{R_{Foil\ 1} + R_{Foil\ 2}}$$

$$RTD\ TCR = \frac{(R_{Element} \times TCR_{Element}) + (R_{Foil\ 1} \times TCR_{Foil\ 1}) + (R_{Foil\ 2} \times TCR_{Foil\ 2})}{R_{Element} + R_{Foil\ 1} + R_{Foil\ 2}}$$

Example:

$$PM\ Element\ TCR = \frac{R_{PT} \times TCR_{PT} + R_{CuNi} \times TCR_{CuNi} + R_{Cu} \times TCR_{Cu}}{R_{PT} + R_{CuNi} + R_{Cu}}$$

$$PM\ Element\ TCR = \frac{99.11(\Omega) \times 1.3850(\Omega/\Omega/°C) + .09(\Omega) \times 1.0124(\Omega/\Omega/°C) + .8(\Omega) \times 1.4270(\Omega/\Omega/°C)}{99.11(\Omega) + .09(\Omega) + .8(\Omega)}$$

$PM\ Element\ TCR = 1.3850$

FIG. 6

RESISTIVE TEMPERATURE DETECTOR ASSEMBLY

This is a United States national patent application filed pursuant to 35 USC §111(a) claiming priority under 35 USC §120 of/to U.S. Pat. Appl. Ser. No. 61/402,068 having a filing date of Aug. 24, 2010 and entitled THERMAL SENSOR CALIBRATION COMPONENT, the disclosure of which is hereby incorporated by reference in its entirety.

TECHNICAL FIELD

The present invention generally relates to thermal sensing, namely, resistance thermometry, more particularly, to resistance temperature detectors, and more particularly still, to means for the calibration of the electrical resistance of a sensing resistor of a resistance temperature detector.

BACKGROUND OF THE INVENTION

Resistive thermometers are temperature detecting or sensing devices that exploit the predictable change in electrical resistance of select temperature sensing materials with changing temperature. Such devices are generally characterized by a metallic element (i.e., a resistive element), and insulated electrical leads operatively linked thereto and extending therefrom. Resistance temperature detectors (RTDs) advantageously include a resistive element, i.e., a select temperature sensing material, comprised of a pure metal whose resistance increases with temperature, while thermistors advantageously utilize a resistive element comprised of a semiconductor whose resistance decreases as temperature increases.

In connection to RTDs, numerous types are known, for example and without limitation, platinum resistance thermometers (PRTs), standard platinum resistance thermometers (SPRTs), industrial resistance thermometer elements, industrial RTD probes, and flexible resistance thermometers. Moreover, RTD metallic elements comprise a variety of forms, with common styles including, but not limited to, unsupported wirewound, wirewound in a ceramic insulator, wire encapsulated in glass, and thin film.

As is well known, the metallic sensing element of an RTD is manufactured to have a specific electrical resistance at a specific temperature. Temperature is determined by measuring resistance, then using the RTD's resistance (R) versus temperature (T) characteristics, i.e., an R/T curve, to extrapolate temperature.

Platinum (Pt) is the most widely specified RTD sensing element type owning to its linear/near linear resistance response over a wide temperature range/ranges, stability, and standardization between manufacturers. Copper (Cu), nickel (Ni), and nickel-iron (Ni—Fe) RTD sensing element types are likewise known and utilized to a lesser extent, but nonetheless suitable for select applications, owing to sensing range limitations having origins in non-linearities in the temperature resistance profile/relationship, and wire oxidation potential in the case of copper.

Resistance/temperature characteristics for RTD sensing elements are well known, and subject of much documentation and a variety of industry standards. As a function of RTD sensing element material (e.g., Pt, Cu, Ni), known standards define resistance versus temperature behavior via non-linear mathematical models, e.g., Pt generally follows a modified Callendar-Van Dusen equation over the range −200 to 850° C., i.e., Pt's R/T curve is modeled using the modified Callendar-Van Dusen equation over the range −200 to 850° C. While the particulars are beyond the scope of the instant disclosure with regard to the mathematical models, reference is made to "Resistance Thermometry: Principles and Applications of Resistance Thermometers and Thermistors," © 2008, Minco, MN, USA, incorporated herein by reference in its entirety.

Historically, RTDs have been specified by their resistance at zero degrees Celsius (0° C.), i.e., "R(0)", and a temperature coefficient of resistance (TCR) "alpha" ($\alpha$). The TCR, in the context of resistance thermometers, is oftentimes defined as the average resistance change per degree Celsius, over the range 0 to 100° C., divided by R(0); more simply, the TCR corresponds to the slope of the R/T curve. In one sense, TCR expresses the sensitivity of the resistive sensing element of the RTD. Although an RTD with a higher sensitivity is not necessarily more accurate, an attendant larger signal simplifies output electronics and is less susceptible to leadwire effects and electrical noise. Moreover, a larger resistance produces the same voltage output with less measuring current which limits self-heating of the element. Literature generally reports the following TCR values, $\Omega/\Omega/°$ C.: Pt, 0.00375-0.003927; Cu, 0.00427; Ni, 0.00678-0.00672; Ni—Fe, 0.00518-0.00527. As is generally reported, RTDs are susceptible to three types of errors, namely, inherent device tolerance, gradients between the device and the medium to be sensed, and error introduced along the path of between the sensor and recorder/display/controller. As to inherency errors, conformity specifies the amount of resistance a device is permitted to depart from a standard mathematical model, e.g., the modified Callendar-Van Dusen equation for Pt. Conformity is characterized by two components, namely, a tolerance at a reference temperature, usually 0° C., and a tolerance at/on the slope, i.e., with regard to the TCR. Generally, an RTD conforms most closely to its R/T curve at the reference temperature, with the resistance "fanning-out" at temperatures above and below the reference temperature.

Owing to a variety of manufacturing factors, resistance shifts, i.e., departures in R(0) values, are commonplace with regard to the resistive temperature sensing element of an RTD. Moreover, the shift variability from one device to the other is just that, variable. Factory calibration checks and calibrations of such devices is thus general operating procedure.

As to heretofore known calibration approaches, resistive wire temperature sensors are commonly built with a high or excessive initial resistance, and arranged such that a portion may be selectively removed from the sensing area. Once removed, the wire pattern is then re-connected or united, as by fusing wire portions together or welding them together with a jumper material.

Alternately, resistive patterns are sputtered or etched onto a substrate using the same resistive material as the sensing element of the RTD, with strand removal or bridging selectively enabled to calibrate the sensor up or down to a target resistance. Using a pattern out of the same resistive material eliminates any altering of the sensing element's electrical properties.

Further still, resistive patterns may be made out of resistors of a dissimilar resistive material from that of the sensing element, with strand removal or bridging selectively pursued to suitably calibrate the sensor. Due to resistive material dissimilarity, and commensurate differences in TCR, such serial arrangement will alter the overall TCR of the RTD. This latter method is typically used for small calibration adjustments so as not to buffer the electrical properties of the RTD out of tolerance.

While heretofore approaches commonly satisfy the overall calibration objective, it is believed advantageous to provide an improved calibration component. More particularly, it is believed advantageous to provide means for calibration of the electrical resistance of a RTD with minimal influence or impact upon its TCR. Moreover, is believed advantageous to simplify the manufacturing of RTDs, and to allow consistent tighter calibration of RTDs over a greater operational range.

SUMMARY OF THE INVENTION

Means and method for the calibration of the electrical resistance of a resistance temperature detector which minimally influences its temperature coefficient of resistance is generally provided. With regard to the RTD assembly, it broadly includes a primary resistive element, characterized by a temperature coefficient of resistance, for detecting temperature, and a calibration component characterized by first and second resistive elements, each operatively united with each other, and with the primary resistive element. The first resistive element is configured and/or adapted so as to permit selective passage of current through at least a portion thereof, with the first and second resistive elements, each characterized by temperature coefficients of resistance, the primary resistive element having a temperature coefficient of resistance value intermediate each of the temperature coefficient of resistance value associated with the first and second resistive elements.

The contemplated method of calibrating a resistance temperature detector, characterized by an integral calibration component, generally and broadly includes providing first and second resistive elements, each operatively united with each other and to/with a primary resistive element. The first resistive element is configured and/or adapted so as to permit selective passage of current through at least a portion thereof, with the first and second resistive elements characterized by temperature coefficients of resistance which straddle a value of the temperature coefficients of resistance associated with the primary resistive element (i.e., one possesses a value less and one a value greater than that of the primary resistive element). A resistance for the first resistive element is selectively established in light of a resistive contribution of said second resistive element in furtherance of calibrating the resistive element of the resistance temperature detector with minimal influence on the temperature coefficient of resistance of the resistive element of the resistance temperature detector.

BRIEF DESCRIPTION OF THE DRAWINGS

FIG. 5 provides, in table format, an illustrative pick/bridge adjustment schedule for the platinum "M" series RTD;

FIG. 6 provides illustrative formulae associated with disclosed calibration method/component for the platinum "M" series RTD; and, FIG. 7 depicts calibration methodology mechanics or underpinnings related to/for the platinum "M" series RTD.

DETAILED DESCRIPTION OF THE INVENTION

Figure 1:
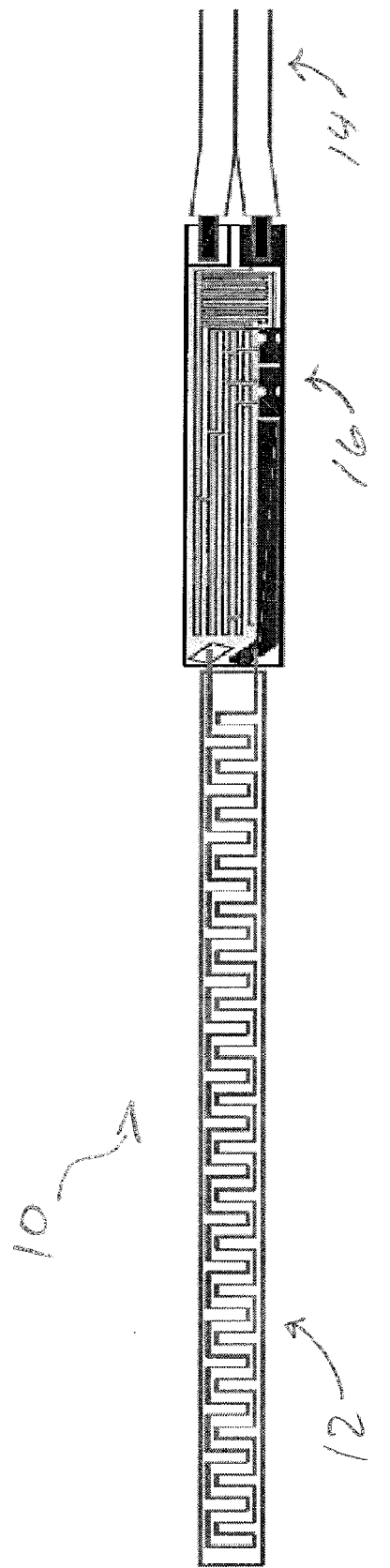
FIG. 1 depicts an illustrative, non-limiting improved resistive temperature detector (RTD) assembly, plan view.
Figure 2:
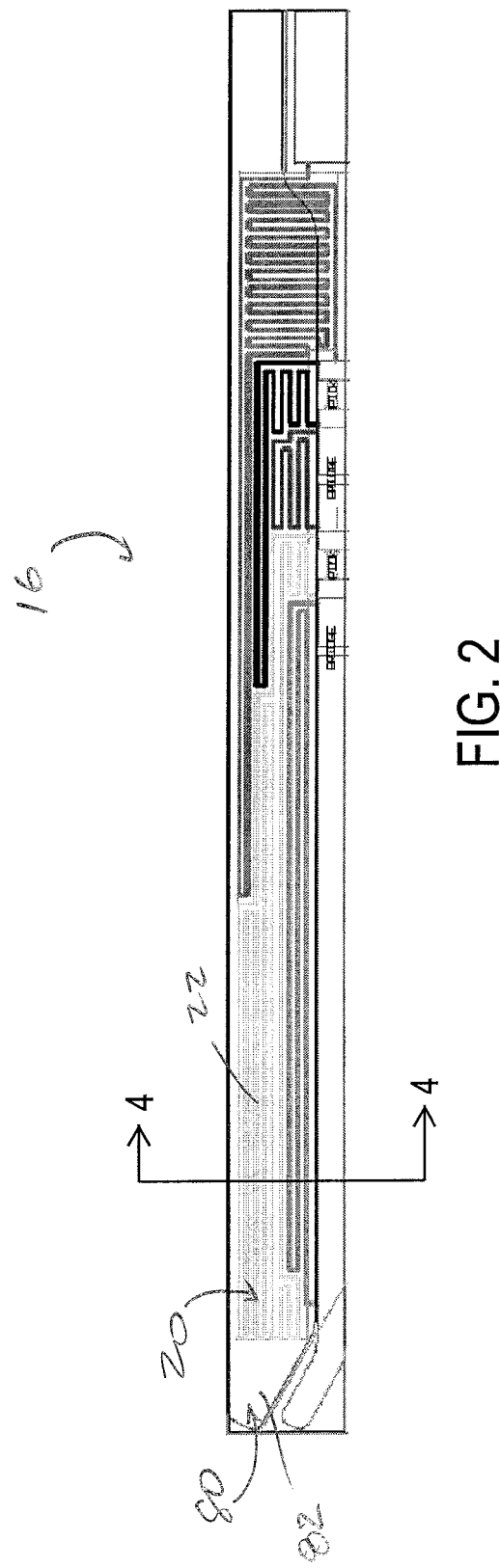
FIG. 2 depicts an illustrative, non-limiting calibration component, e.g., a tab, of an RTD assembly, for example, but not necessarily, as that of FIG. 1, plan view, more particularly, a sample calibration component for a platinum "M" series RTD of Minco Products, MN, USA.

With regard to the instant description and the referenced figures, FIG. 1 generally depicts an illustrative RTD, whereas FIG. 2 depicts an illustrative, non-limiting embodiment of a contemplated advantageous calibration component part and parcel of an RTD as depicted in FIG. 1. As is well know, and as was earlier discussed, numerous RTD types and styles are known, with each having their pros and cons, and application specific criteria. In light thereof, the balance of the depictions are representative of a platinum RTD assembly characterized by a calibration component comprised of, in operative union, a Cu calibration first subassembly, and a CuNi buffering second subassembly. Thus, specifics shall follow generalities.

With reference to FIG. 1, there is depicted a resistive temperature detector assembly 10 characterized by a resistive temperature detector 12, lead wires, for example a pair of lead wires 14 as shown, and a calibration component 16. The calibration component, e.g., a tab, advantageously includes first 22 and second 82 resistive materials in the form of, for example, operatively integrated subassemblies, i.e., first subassembly 20 characterized by first resistive material 22, and second subassembly 80, characterized by resistive material 82. Moreover, and as will be later detailed, in furtherance of a calibration functionality, the resistive material of one of the subassemblies, e.g., the first subassembly of FIG. 2, is configured and/or adapted so as to permit selective passage of current through at least a portion thereof.

Advantageously, the resistive materials of the component are different from each other, and each material is different from the resistive material of the resistive temperature detector, i.e., a primary resistive material. As such, the primary resistive element is characterized by a temperature coefficient of resistance TCR1; first subassembly resistive material characterized by a temperature coefficient of resistance TCR2; and, the second subassembly resistive material characterized by a temperature coefficient of resistance TCR3. Generally, the value of TCR1 is intermediate the values of, TCR2 and TCR3, i.e., has a value within a range delimited or bounded by the values of TCR2 and TCR3. As is well known in an RTD context, the resistive materials comprise a metallic material, e.g., a pure metal or metal alloy/metallic composition.

Notionally, the calibration component is utilized as an inline transition between the resistive material or element of the RTD and the assembly leads. Functionally, the calibration component or tab accomplishes R/T calibration and TCR buffering.

In furtherance of the calibration functionality, i.e., the establishment/reestablishment of a target T value at a select R value, e.g., R(0), the resistance of the first subassembly is selectable, as for example by the "addition" or "subtraction" of one or more quantities of resistive materials (i.e., "tuning" the resistance of the subassembly) from a nominal range of resistance for/associated with the subassembly, i.e., a resistance $R_{select}$ is established, e.g., mechanically, for the subassembly, with $R_{select}$ being with a range of resistive values delimited by the maximum ($R_{max}$) and minimum ($R_{min}$) resistance for the subassembly. Means for such resistive deletions/additions are generally known.

In furtherance of the buffering functionality, i.e., offsetting the increasing TCR departure present above/below the calibration value due the introduction of the resistance via the first subassembly, the resistance of the other subassembly, e.g., the second subassembly of FIG. 2, is advantageously, but not necessarily, preselect as opposed to selectable as the counterpart resistive contribution of the first subassembly. Generally, the resistance or resistive range of the buffering element is driven by, among other things, the select resistive range of the calibration element, i.e., that delimited by $R_{max}$ and $R_{min}$.

Figure 3:
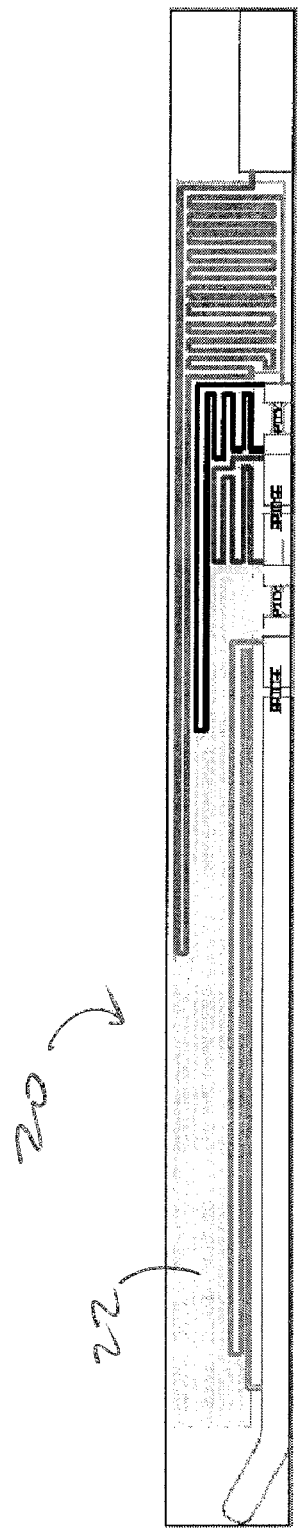
FIG. 3 depicts a subassembly of the calibration component of FIG. 2, plan view.
Figure 4:
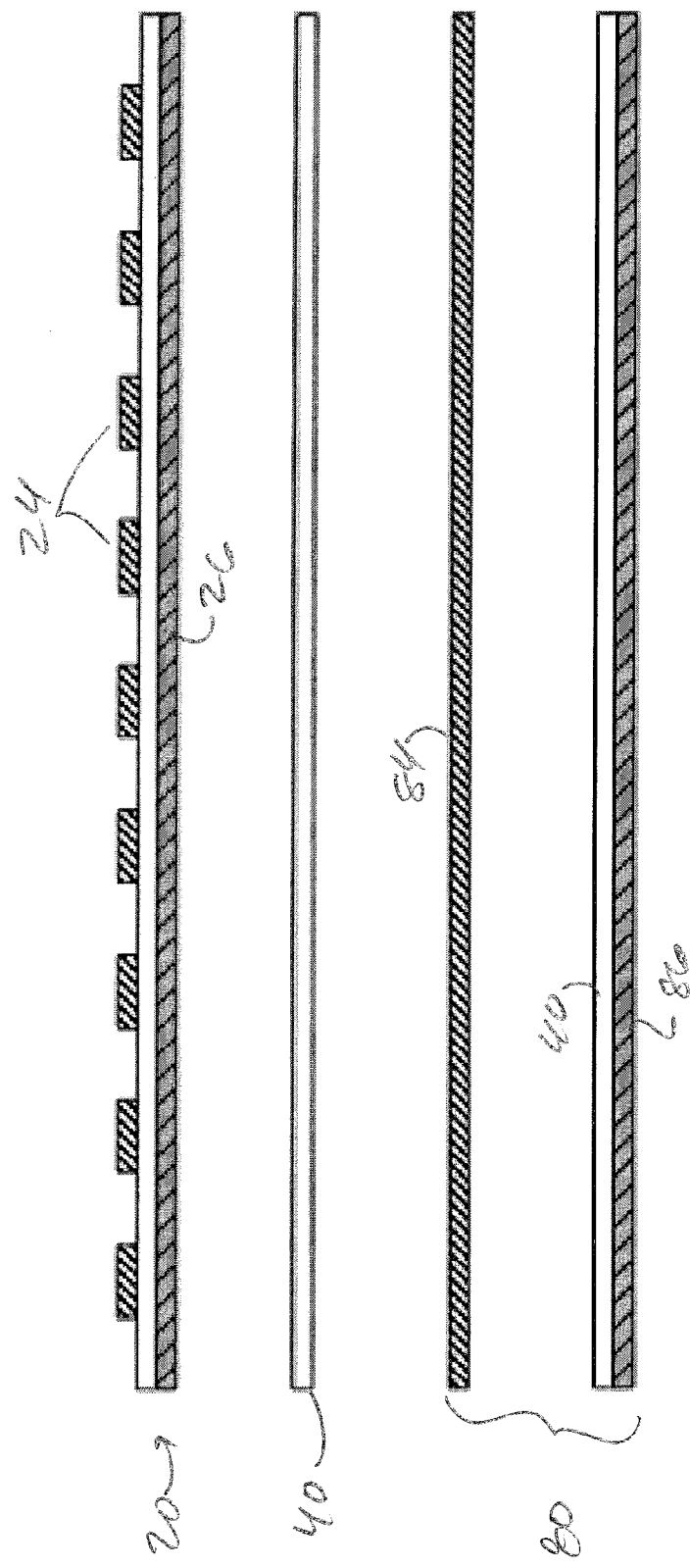
FIG. 4 represents section 4-4 of FIG. 2, exploded view.

With continued reference to FIG. 2 and further reference to FIGS. 3 & 4, particulars with regard to representative platinum RTD are provided for the sake of illustration. More particularly, there is generally shown a calibration component or tab comprised of a first subassembly 20 characterized by Cu, and a second subassembly characterized by CuNi (cupronickel). Select particulars with regard to the RTD assembly are as follows: $TCR_{Pt}$ is nominal 0.00385 Ω/Ω/° C., and within the range of 0.003838-0.003862 Ω/Ω/° C.; $TCR_{Cu}$ is nominal 0.004270 Ω/Ω/° C.; $TCR_{CuNi}$ is nominal 0.000124 Ω/Ω/° C.; device tolerance specification is greater than Class A (i.e., +/−0.06Ω), namely, +/−0.03Ω; and, a resistive contribution (%) of Cu relative to the component, i.e., total resistive contribution of Cu and CuNi, is within the range of 80-94.

Generally, with regard to the illustrative calibration component of FIG. 2, e.g., a film/laminate for or part and parcel of a thin/flexible film or "stick" RTD assembly, it is generally comprised of two distinct elements. A dielectric substrate is provided in the form of a film, such as but not limited to polyimide or epoxy glass. Two dissimilar conductive metal or metal alloys, e.g., Cu and CuNi as noted, are present, in the form of foil, and generally selected for their desired electrical properties in relation to the primary resistive material of the RTD. The metal is patterned to form contact areas for attaching both fine sensing element wires and larger electrical contact wires. Between the contact areas lies a pattern that creates multiple current paths from which one or more are selectable. The current paths can be patterned by etching, plating, sputtering, or multiple element wires.

As is readily appreciated with reference to the particulars of FIG. 4, "stacked" component elements generally comprise conductive and dielectric layers. More particularly, as illustrated, the first subassembly 20 comprises a selectively configured 0.5 oz Cu foil 24 supported upon a Kapton base 26. The second subassembly 80 comprises a 0.0023" CuNi foil 84 likewise supported upon a Kapton base 86. Each of these subassemblies are united via a 0.002" adhesive layer 40 as is generally known.

In connection to the first subassembly, and as earlier noted, the resistive Cu foil is arranged in a pattern such that its resistance can be increased or decreased through altering the current path. In as much as objective may be suitably satisfied via a variety of known techniques, advantageously, this is achieved by removing shorts (i.e., picking) and/or adding shorts (i.e., bridging) within the foil pattern. Again, the additive resistances of the conductive metals of the calibration tab will generate electrical properties similar to that of the primary resistive element of the RTD.

Preferably, but not exclusively, four discrete pattern potions of the Cu foil pattern are provided as shown in the illustrative embodiment of FIG. 4. More particularly, two pick (P1, P2) and two bridge (B1, B2) portions are noted. Each pattern portion, e.g., stranded metallic material, posses a nominal resistance, e.g., P1, 0.14Ω, P2, 0.56Ω, B1, 0.07Ω, and B2, 0.28Ω.

Figure 7:
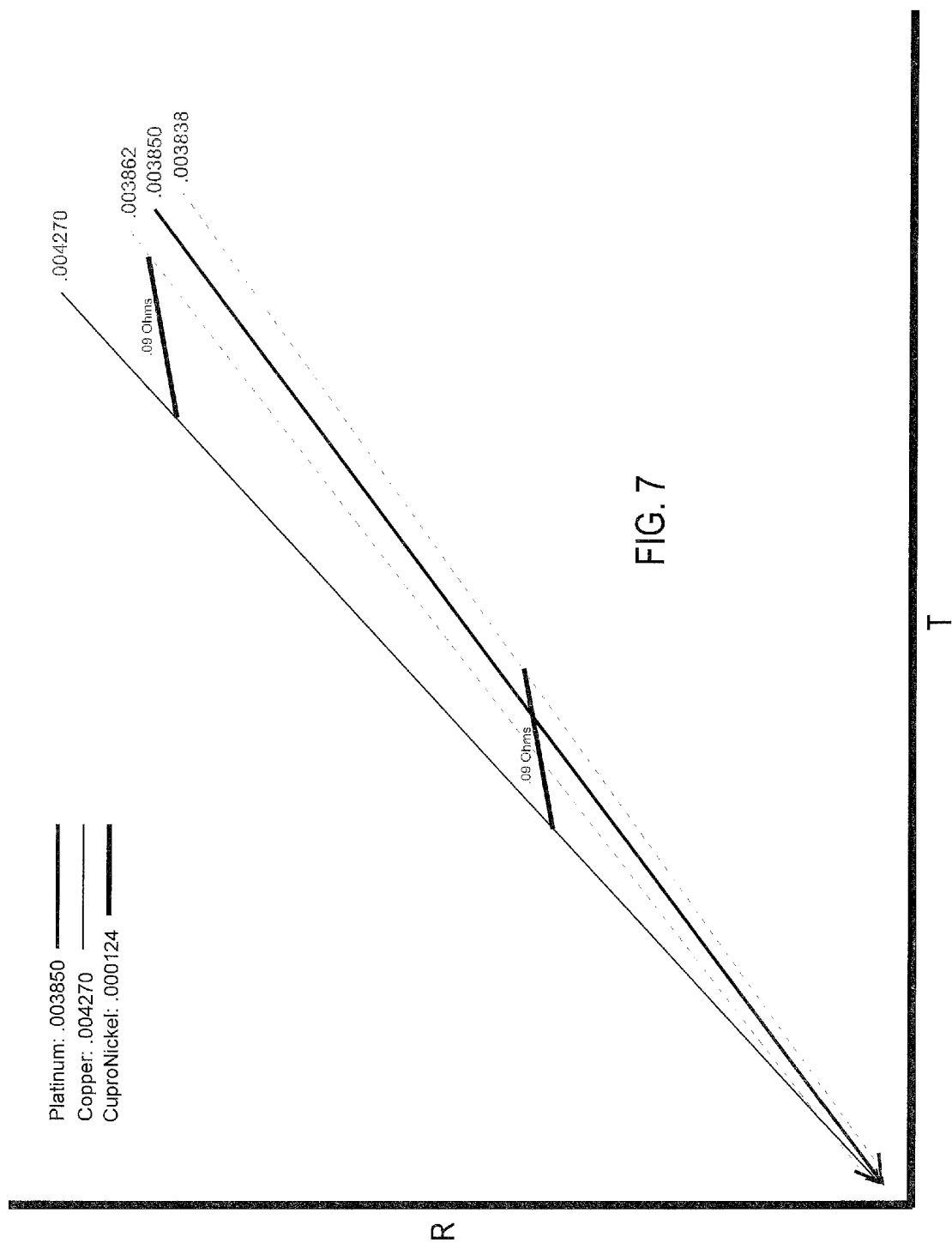

With reference now to content captioned FIGS. 5-7, there is provided further particulars in connection to the illustrative embodiment. An overview of the adjustment schedule of FIG. 5 associated with calibration, i.e., select criteria for the resistance of the first subassembly, initially follows, with brief overview of or reference to the formulae of FIG. 6 and calibration methodology mechanics or underpinnings of FIG. 7.

In connection to the adjustment or calibration table of FIG. 5, several preliminary comments will facilitate discussion. First, for a measured/indicated departure in R(0) for the platinum "M" series RTD within the indicated min/max ranges, table right, a resistive remedy is provided in the form of correlated resistive adds/deletions as the case may be with regard to the Cu material. Second, as to the format or presentation of information, the columns, left to right with regard to the caption "Configurations" correlate to/with each of P1, P2, B1, and B2. Moreover, the caption "Δ Resistance" reflects a sum of each row of the resistance contributions of each/any of P1, P2, B1, and B2.

Two pick and two bridge adjustments are contemplated for the resistive material of the first subassembly of the calibration tab of the instant RTD assembly. As previously noted, the method of calibration allows a piece of foil to be welded across a jumper area to bypass a current pathway "bridge." The two current pathways representative of the bridges allow a reduction of 0.07Ω and 0.28Ω. The method of calibration also allows the removal of a shorted current strand by the method of a "pick." Removing these shorts will redirect the current through a new pathway that increases resistance by 0.14Ω and 0.56Ω. Nominal tab resistance is approximately 0.80Ω. Combinations of picks and bridges illustrated in the table allow a total increase in resistance of 0.70Ω and a total decrease of 0.35Ω (e.g., see first and last entries of the "Δ Resistance" column, namely, those correlating to B1+B2 and P1+P2). The combinations allow calibration tolerance to be within +/−0.03Ω as indicated at table right.

As should be appreciated in light of the subject disclosure, the generic expressions of FIG. 6 (top portion) provide for select TCR determinations associated with the instant RTD assembly. Moreover, in keeping with the illustrative disclosure to this point, sample calculations are provided for the platinum "M" series RTD as indicated, wherein the indicated TCR values are the indicated values multiplied by $10^{-3}$ (i.e., PM Element TCR=0.0013850).

As should likewise be appreciated in light of the subject disclosure, the underpinnings of the instant calibration method, and attendant calibration device/RTD assembly, is to be noted. Notionally, $TCR_{Pt}$ is indicated, nominally at 0.003850 Ω/Ω/° C., and as temperature increases, increasing departures are noted, to a general min/max as indicated, namely, 0.003838 Ω/Ω/° C. and 0.003862 Ω/Ω/° C. In connection to calibration, $TCR_{Cu}$ is indicated, nominally at 0.004270 Ω/Ω/° C., with $TCR_{CuNi}$ is indicated, nominally at 0.000124 Ω/Ω/° C. Essentially, as indicated, for an upper range of temperature, greater certainty with regard to calibration is permitted as the calibrated value is buffered to $TCR_{Pt}$ min at the low(er) end of the temperature range and $TCR_{Pt}$ max at the high(er) end of the temperature range so a to yield a more reliable RTD assembly over a broader range of resistance.

Finally, since the structures of the assemblies/mechanisms disclosed herein may be embodied in other specific forms without departing from the spirit or general characteristics thereof, some of which forms have been indicated, the embodiments described and depicted herein/with are to be considered in all respects illustrative and not restrictive. Accordingly, the scope of the one or more disclosed inventions is/are as defined in the language of the appended claims, and includes not insubstantial equivalents thereto.

What is claimed is:

1. A resistive temperature detector assembly comprising:
   a. a primary resistive element for detecting temperature, said primary resistive element characterized by a temperature coefficient of resistance TCR1;
   b. a first subassembly comprising a first subassembly resistive material characterized by a temperature coefficient of resistance TCR2, said first subassembly resistive material configured and/or adapted so as to permit selective passage of current through at least a portion thereof in furtherance of calibration of said primary resistive element; and, c. a second subassembly comprising a second subassembly resistive material characterized by a temperature coefficient of resistance TCR3, a value of one of either of said temperature coefficient of resistance TCR2 or said temperature coefficient of resistance TCR3 being greater than a value of said temperature coefficient of resistance TCR1, a value of another of said either of said temperature coefficient of resistance TCR2 or said temperature coefficient of resistance TCR3 being less than a value of said temperature coefficient of resistance TCR1, said first and said second subassemblies, and said primary resistive element, operatively united for receipt of current therethrough.

2. The resistive temperature detector assembly of claim 1 wherein said first subassembly resistive material comprises discrete patterned metal portions selectively combinable for the select passage of current therethrough.

3. The resistive temperature detector assembly of claim 1 wherein said first subassembly resistive material comprises a stranded metallic material configured for the select passage of current through one or more portions thereof.

4. The resistive temperature detector assembly of claim 1 wherein said first subassembly resistive material comprises a patterned metallic foil characterized by selectively combinable portions.

5. The resistive temperature detector assembly of claim 1 wherein said first subassembly resistive material comprises a patterned metallic foil, at least a portion of portions of said selectively patterned metallic foil being selectively added/subtracted for the passage of current therethrough.

6. The resistive temperature detector assembly of claim 1 wherein said primary resistive element is characterized by a temperature coefficient of resistance TCR1 having a value selected from the group consisting of 0.00375-0.003927, 0.00427, 0.00618-0.00672, or 0.00518-0.00527 $\Omega/\Omega/°$ C.

7. The resistive temperature detector assembly of claim 1 wherein said first subassembly and said second subassembly, in combination, delimit a film element.

8. The resistive temperature detector assembly of claim 1 wherein said first subassembly and said second subassembly, in combination, delimit a laminate element.

9. The resistive temperature detector assembly of claim 8 wherein said primary resistive element comprises platinum, said first subassembly resistive material comprises copper, and said second subassembly resistive material comprises cupronickel.

10. The resistive temperature detector assembly of claim 9 wherein a resistive contribution of said copper is within a range of 80-94% of the resistive capacity of a combined resistivity for said first subassembly and said second subassembly.

11. The resistive temperature detector assembly of claim 9 wherein a resistance for said first subassembly resistive material is selectable so as to be within a range of about 0.36-1.41$\Omega$.

12. The resistive temperature detector assembly of claim 1 wherein said primary resistive element comprises platinum, said first subassembly resistive material comprises copper, and said second subassembly resistive material comprises cupronickel.

13. The resistive temperature detector assembly of claim 12 wherein a resistive contribution of said copper is within a range of 80-94% of the resistive capacity of a combined resistivity for said first subassembly and said second subassembly.

14. The resistive temperature detector assembly of claim 12 wherein a resistance for said first subassembly resistive material is selectable so as to be within a range of about 0.36-1.41$\Omega$.

15. A method of calibrating a resistance temperature detector characterized by an integral calibration component, the method comprising the steps of:

a. providing first and second resistive elements, each operatively united with each other, and with a resistive element of the resistance temperature detector, said first resistive element configured and/or adapted so as to permit selective passage of current through at least a portion thereof and characterized by a temperature coefficient of resistance TCR1, said second resistive element characterized by a temperature coefficient of resistance TCR2, a temperature coefficient of resistance TCR3 of the resistive element of the resistance temperature detector having a value intermediate the value of TCR1 and TCR2; and, b. selectively establishing a resistance for said first resistive element in light of a resistive contribution of said second resistive element in furtherance of calibrating the resistive element of the resistance temperature detector with minimal influence on said temperature coefficient of resistance TCR3 of the resistive element of the resistance temperature detector.

* * * * *